United States Patent [19]

Baumann

[11] 4,270,309

[45] Jun. 2, 1981

[54] PLANT RECEIVING VESSEL FOR INSERTION IN A HYDROPONIC VESSEL

[75] Inventor: Gerhard Baumann, Berne, Switzerland

[73] Assignee: Interhydro AG, Berne, Switzerland

[21] Appl. No.: 669,747

[22] Filed: Mar. 24, 1976

[30] Foreign Application Priority Data

Mar. 24, 1975 [DE] Fed. Rep. of Germany ....... 2512296
Oct. 16, 1975 [CH] Switzerland ....................... 13417/75

[51] Int. Cl.³ ...................... A01G 31/02; A01G 9/02
[52] U.S. Cl. ......................................... 47/59; 47/63; 47/79
[58] Field of Search ....................... 47/1.2, 38, 38.1, 47, 47/79-81, 59-64; 116/118 R; 73/323; 220/17, 63 R

[56] References Cited

U.S. PATENT DOCUMENTS

| 1,210,385 | 12/1916 | Hunziker | 73/323 |
| 1,347,398 | 7/1920 | O'Rourke | 73/323 |
| 1,444,666 | 2/1923 | Davis | 47/34 R |
| 2,593,172 | 4/1952 | Neumann | 73/323 |
| 3,215,307 | 11/1965 | Connell | 220/63 R |
| 3,483,656 | 12/1969 | Baumann | 47/1.2 |
| 3,659,825 | 5/1972 | Reiter | 220/17 X |

FOREIGN PATENT DOCUMENTS

| 1806518 | 5/1970 | Fed. Rep. of Germany | 47/1.2 |
| 2316275 | 10/1974 | Fed. Rep. of Germany | 47/1.2 |
| 2345899 | 3/1975 | Fed. Rep. of Germany | 47/1.2 |
| 156676 | 10/1932 | Switzerland | 47/47 |
| 253227 | 6/1926 | United Kingdom | 47/47 |
| 1131156 | 10/1968 | United Kingdom | 47/38 |
| 1270450 | 4/1972 | United Kingdom | 47/38 |

Primary Examiner—Steven A. Bratlie
Attorney, Agent, or Firm—Imirie & Smiley

[57] ABSTRACT

A set for the hydroculture of plants comprising a plant-receiving vessel and at least one ancillary device such as a water-level indicator, structure being provided on said vessel and said ancillary device for removably connecting the ancillary device to the vessel wall from the exterior, it being thus possible to attach or remove the ancillary device at any time whether a plant be contained in the vessel or not.

5 Claims, 4 Drawing Figures

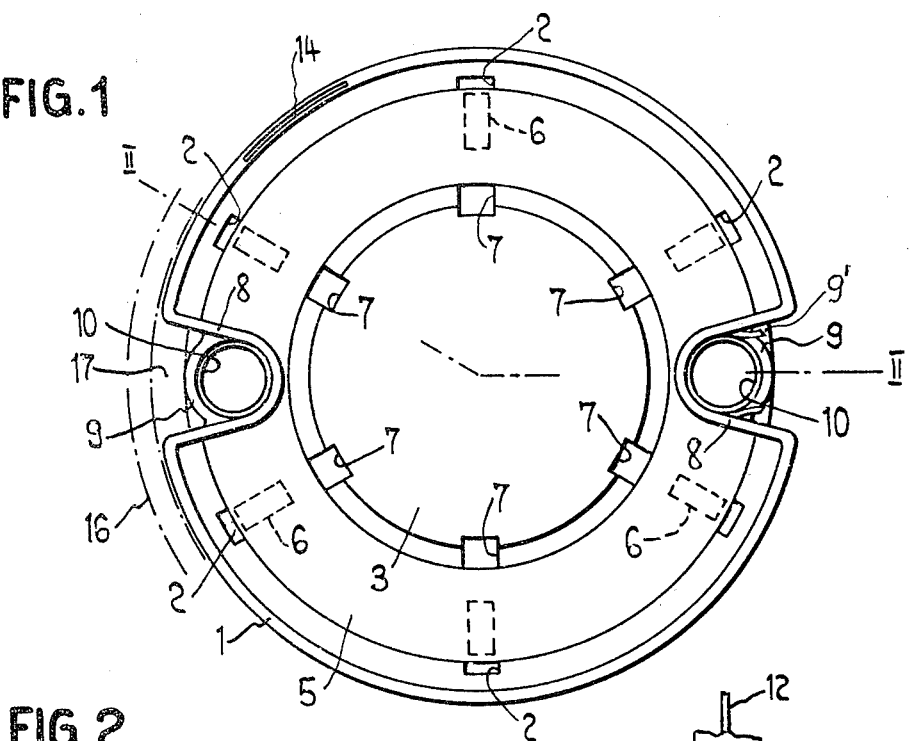

PLANT RECEIVING VESSEL FOR INSERTION IN A HYDROPONIC VESSEL

BACKGROUND OF THE INVENTION

The present invention relates to apparatus for the hydroponic culture of plants having a plant receiving insertion vessel preferably made of plastic material with a perforated wall and at least one ancillary device which is connectable to the vessel. Hydroponic insertion vessels are used for cultivating plants for hydroculture and are inserted individually or in groups together with the plants into hydroculture vessels.

It is already known in a plant receiving vessel of plastic material to provide a hole in the base of the vessel for inserting a water level indicator (see German Gebrauchsmuster No. 7339503). The water level indicator is inserted before planting whereupon the substratum and the plant to be cultivated are then charged. This operation is complicated by the presence of the water level indicator in the vessel space since such is not reliably anchored. As it cannot be foreseen as to which of the cultivated plants are finally charged individually or in groups in the hydroculture vessel, all vessels each have to be provided with a water level indicator since it is virtually impossible to subsequently insert a water level indicator into the vessel once filled with substratum and cultivated. When inserting the pre-cultivated plants in groups in hydroponic vessels therefor, all but one of the water level indicators should be removed from the inserted vessels which is a cumbersome or impossible task and generally harmful to the plants. Alternatively the water level indicators may be left inserted in all vessels but this, however, is uneconomical and undesirable from an aesthetic point of view.

SUMMARY OF THE INVENTION

It is an object of the invention to provide a plant receiving insertion vessel for the hydroculture of plants in hydroponic apparatus which permits one or more ancillary devices, for example, a water level indicator and/or a watering and extraction tube to be supplied or removed without effort and without danger of damage to the plant.

According to the present invention there is provided a plant receiving vessel for insertion in a hydroponic vessel for the hydroculture of plants and having a perforated wall and at least one ancillary device which is connectable to the vessel, characterised by the feature that means are arranged for connecting at least one ancillary device to the vessel in such a manner that the ancillary device can be connected with the vessel wall from the exterior.

Since the ancillary devices, such as water level indicator, watering and extraction tube or the like, can be attached to the outside of the vessel wall, the above-mentioned conditions have apparently been fulfilled. The vessel wall preferably has one dent or hollow formed therein in which the ancillary device(s) may be so arranged that it or they do not project beyond the space of the hollow. In this case the attachment of the ancillary devices from outside the vessel wall does not cause any restriction in the applicability of the vessel i.e. the vessel may be inserted with little or substantially no clearance in a container adapted to its shape, for example, a hydroculture pot or in a cylinder placed in a hydroculture vessel while keeping the space for the insert vessel open.

The invention will be described further, by way of example, with reference to the accompanying drawings.

BRIEF DESCRIPTION OF THE DRAWINGS

FIG. 1 is a plan view of a plant receiving vessel;
FIG. 2 is a section taken on the line II—II of FIG. 1.

DETAILED DESCRIPTION OF THE INVENTION

Figure 3:
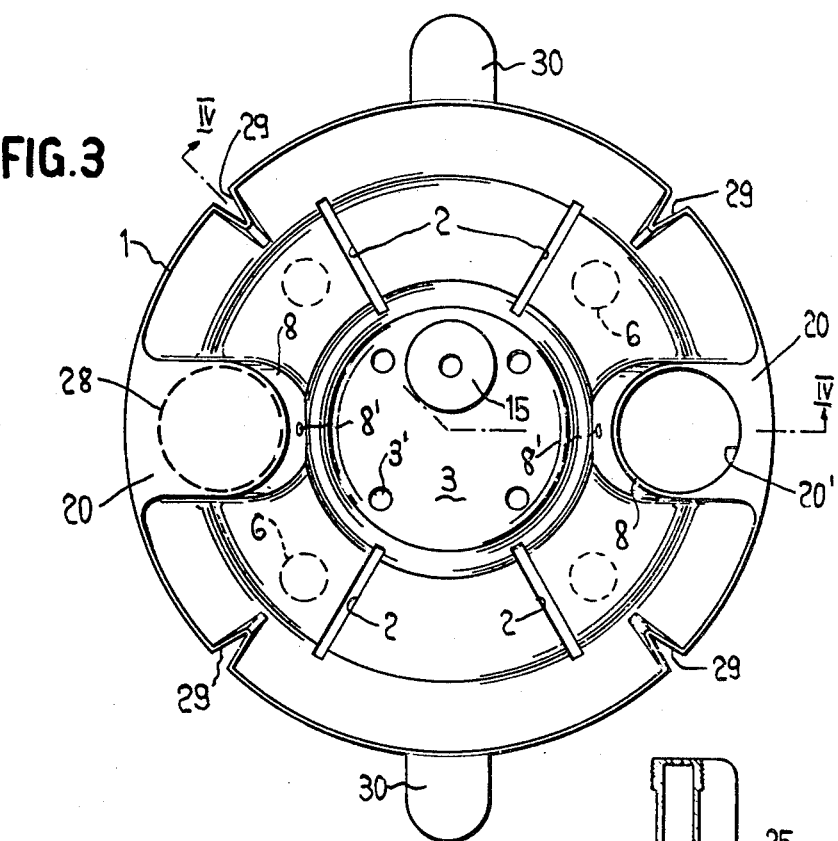
FIG. 3 is a plan view of a second embodiment of a plant receiving vessel.

A plant receiving vessel is shown in FIGS. 1 and 2 and is designed for insertion in a hydroponic vessel or outer container. The plant receiving vessel is made of a suitable plastic material and has a slightly tapering wall 1 which has a continuous surface in an upper portion but has a plurality of slots 2 formed in a lower portion thereof. By the formation of a raised central portion 3 extending into the interior of the vessel a corresponding recess or hollow space 4 is formed in the base 5 of the vessel which is also provided with feet 6. The lower part of the vessel during cultivation is immersed in a nutrient solution contained in a hydroponic vessel and said solution is able freely to circulate below the base 5, in the hollow space 4 through the slots 2 of the vessel wall and through slots 7 formed in the raised central portion 3 of the base.

Groove-like hollows or recesses 8 are formed in the vessel wall at two diametrically opposite positions and extend over the full height of the vessel. A retaining ring 9 is provided at the lower end of each of the hollows 8 and each has a cylindrical bore 10 for receiving an ancillary device. While an ancillary device is not shown in FIG. 1, an ancillary device is shown in FIG. 2 and is, by way of example, a water level indicator 11 comprising a tube in which a float (not shown) is located on the lower end of a vertically displaceable indicating rod 12 which is not visible from the exterior. The wall of the water level indicator 11 has one or more slots 13 formed therein at the lower end which slots impart a certain elasticity to said lower end and enables the water level indicator to be readily inserted in one retaining ring 9 and also to be safely retained in the retaining ring due to its natural elasticity. In the other retaining ring 9 of the vessel a water filling and extraction tube may, for example, be inserted.

As is clearly shown in the drawings, all portions of the retaining ring 9 and the water level indicator 11 are located in the space of the hollow 8. In other words, none of these elements at any point project beyond the overall circular cross-section of the plant vessel. As mentioned, these elements do not present any obstruction or restriction in the use of the cultivated or uncultivated vessel.

At the edge of the vessel a slot 14 is provided for receiving a label. Furthermore, a cylindrical holder 15 is formed on the raised portion 3 of the base to receive, for example, a flower stake, branch or the like support.

Various alternative embodiments and modifications are possible. Thus, only one hollow 8 may be provided whereby the retaining device will generally serve to secure the water level indicator. If in this case each vessel is individually located in a hydroculture or hydroponic pot, container or in a jacket inserted in a large hydroculture vessel to define an insertion space, such a jacket being denoted by 16 in FIG. 1, then between this jacket 16 or the edge of a hydroculture vessel in which the container 1 is inserted with the ancillary device, an opening 17 is left which in this case could be used as a pouring and extraction opening.

If two indentations and retaining devices are provided, then one may be used for attaching a water level indicator and the other for inserting a long term fertilizer container. The two hollows also facilitate picking-up of the vessel. One of the hollows may also act as a pouring and extraction opening.

The edge of the vessel shown may, if desired, also be provided with a flange or with individual lugs or the like members which facilitate gripping and lifting of the transplanted vessel.

While slots are shown in the drawing both in the vessel wall 1 and the raised central portion 3 of the base, it is also possible to provide other apertures on the raised portion of the base of the vessel acting as a substratum displacing member and it is furthermore also possible to mould other retaining members for stakes, branches and the like.

The plastic materials from which the vessel as shown is made may be hard or soft depending upon its intended purpose. Consequently, the holding devices may be somewhat differently formed depending upon whether they have a certain natural resilience or not. Thus, for example, it would also be possible to impart a different shape to the hollow or hollows so as to form, for example, an undercut groove or circular cross-section. In this case, a water level indicator or the like could be simply inserted with clearance in this groove. Clip-like resiliently spreadable retaining devices 9; as shown in FIGS. 1 and 2, may also be provided.

The tube 11 of the water level indicator may under certain circumstances be integrally moulded on the wall 1 of the vessel. In this case, a cover with a float and a dip-stick 12 as water level indicator are removably inserted in the tube which is open at the top acting as retaining device. Such a tube integrally moulded with the vessel may advantageously also act to receive a long term fertilizer which particularly is useful when said fertilizer is noxious and hence should be inaccessible.

As shown in FIG. 1, all the available space of the hollows 8 is not fully utilised since the retaining rings 9 do not extend at the outer edge thereof beyond the periphery. In order to gain further space and to make the space available better utilisable for additional implements, the base or the retaining ring 9 may be modified such that the retaining ring extends, in projection, to the position of the periphery of the upper vessel edge.

Figure 4:
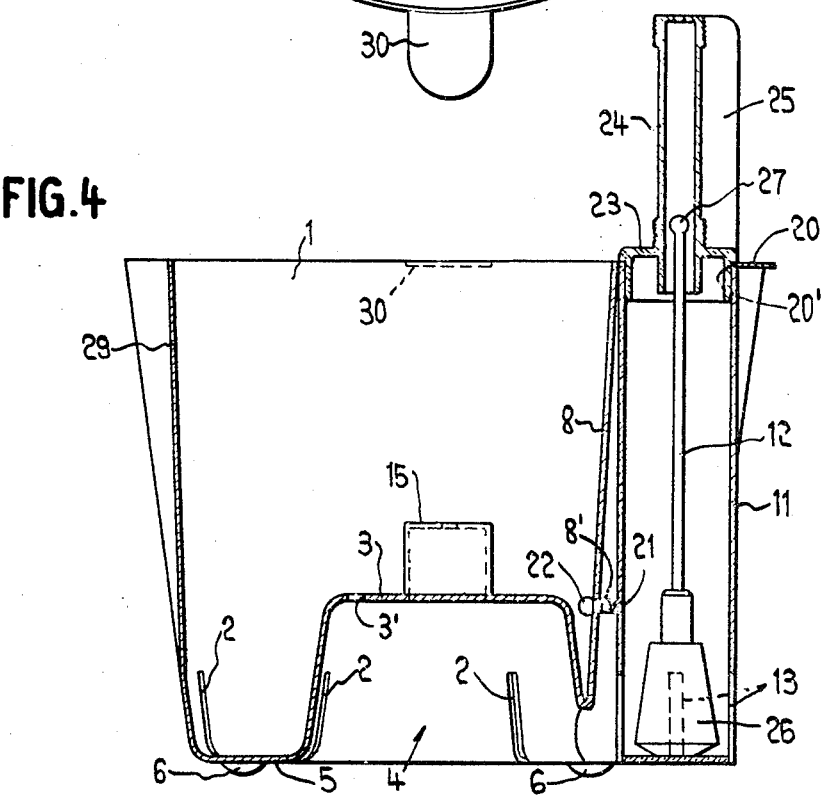
FIG. 4 is a section taken on the line IV—IV of FIG. 3.

In FIGS. 3 and 4 corresponding parts of the vessel are given the same designations as in FIGS. 1 and 2. The embodiment of the vessel in accordance with FIGS. 3 and 4 differs from that of FIGS. 1 and 2 in that the vessel wall in the region of each hollow is braced by a wall portion 20 covering the hollow at the upper edge of the vessel. Furthermore, the retaining ring 9 is omitted from the lower end of the recess or recesses. The tube 11 of the water level indicator in this case has a retaining pin 21 with an anchoring head 22 by means of which the tube 11 is anchored in a hole 8' of the vessel wall. On the upper end of the tube 11, a cover 23 is mounted having a tubular extension 24. The cover 23 passes through an opening 20' of the wall portion 30 and secures the upper end of the tube 11 in the required position. The extension 24 is provided with a lateral lug 25 which may support a scale for reading the water level. On the upper end of the rod 12 connected to the float 26 of the water level indicator, a head 27 is provided which facilitates the reliable reading of the water level.

As shown in FIG. 3 in which the water level indicator is not shown, a portion defined by perforations 28 and adapted to be broken out is formed in the wall portion 20 located over the left-hand hollow, in order, for example, to permit the insertion of a pouring and extraction tube which may be similarly secured as the tube 11 of the water level indicator.

The vessel wall has folds or grooves 29 at certain points which permit the circumference or the diameter of the upper edge of the vessel to be reduced when the vessel or the recessed space in which the insert vessel is to be inserted is somewhat restricted.

Two lugs 30 are provided at the upper edge of the vessel and serve for insertion and removal of the insertion vessel in another container or recess.

The plant receiving vessel in accordance with FIGS. 3 and 4, also differs from that shown in FIGS. 1 and 2 in that continuous slots 2 are provided which extend from the lower portion of the vessel wall 1 over the base 5 and to the raised central portion 3.

The central portion 3 is provided with openings 3'.

In both wall portions 20 parts defined by perforations 28 and adapted to be broken out may be provided for forming openings 20' since eventually in many cases neither a water level indicator nor a pouring and extraction tube needs to be inserted and hence no opening 20 is required.

A substantial advantage of the vessel according to FIGS. 3 and 4 resides in its optimum stackability when empty i.e. even when a water level indicator or the like additional device is present. The depth of the folds 29 is reduced downwardly and said folds in no way obstruct stacking.

What we claim is:

1. An assembly for use in the hydroculture of plants, comprising a plant receiving vessel of thin-walled material, an outwardly extending flange at the upper rim of said vessel, apertures in the wall of the vessel for exchange of nutritive solution, at least one ancillary instrument instruments being a water level indicator having a tube and a float coupled with an indicating member within said tube, at least one opening in said flange of the vessel, said opening being adapted for sliding insertion of said water level indicator through it, a retaining pin on said tube of the water level indicator and a hole in the wall of said vessel adapted to receive said retaining pin, said water level indicator being thus removably attachable to said vessel by inserting its tube into said opening of said flange and its retaining pin into said hole of said vessel wall.

2. A device for use in hydroponics, including a plant receiving vessel defining a planting space inside and having apertures in its wall for exchange of nutritive solution and at least one ancillary instrument which may be assembled with said vessel, one of said ancillary instruments being a water level indicator having a tube with apertures at a lower end for exchange of the solution and a float coupled with an indicating member within said tube, means being provided for removably fixing said water level indicator directly to a wall of said vessel outside the same in such a manner that the water level indicator is entirely outside the planting space of said vessel but inside the overall cross-section of the vessel at the widest portion thereof such that the vessel assembled with the water level indicator may be transported and inserted into a hydroponic container and that the water level indicator assembled with said vessel does not project beyond the bottom of the vessel, and in which a bracing wall portion is provided over the top of at least one vessel groove in the wall of said vessel, said bracing wall portion having an opening or a portion to be broken out to form an opening.

3. A device as claimed in claim 2, in which the retaining device for an ancillary device has a retaining pin fixed thereon and insertable in a hole in the vessel wall to mount said ancillary device on said vessel wall.

4. A device as claimed in claim 3, in which said water level indicator has a retaining pin fixed thereon and which engages the hole of the vessel wall and the tube of the water level indicator is provided with a cover which passes through the opening of the bracing wall portion and thereby secures the tube to said wall portion.

5. A device as claimed in claim 4, in which the cover has a tubular attachment to receive a dip stick of the water level indicator.

* * * * *

UNITED STATES PATENT OFFICE
CERTIFICATE OF CORRECTION

Patent No. 4,270,309　　　　　　　　Dated June 2, 1981

Inventor(s) Gerhard Baumann

It is certified that error appears in the above-identified patent and that said Letters Patent are hereby corrected as shown below:

Correct Claim 1 at column 4, line 45, by inserting between "strument" and "instruments" the following:

--which may be assembled with said vessel, one of said ancillary--

Signed and Sealed this

Twenty-second Day of September 1981

[SEAL]

Attest:

Attesting Officer

GERALD J. MOSSINGHOFF

Commissioner of Patents and Trademarks